Oct. 25, 1960  F. W. McCOMBIE  2,957,579
LIQUID STRAINERS

Filed Sept. 30, 1957  4 Sheets-Sheet 1

INVENTOR
FREDERICK W. McCOMBIE
BY
ATTORNEY

Oct. 25, 1960  F. W. McCOMBIE  2,957,579
LIQUID STRAINERS
Filed Sept. 30, 1957  4 Sheets-Sheet 2

INVENTOR
FREDERICK W. McCOMBIE
BY
ATTORNEY

Oct. 25, 1960    F. W. McCOMBIE    2,957,579
LIQUID STRAINERS

Filed Sept. 30, 1957    4 Sheets-Sheet 3

INVENTOR
FREDERICK W. McCOMBIE
BY
ATTORNEY

Oct. 25, 1960  F. W. McCOMBIE  2,957,579
LIQUID STRAINERS

Filed Sept. 30, 1957  4 Sheets-Sheet 4

INVENTOR
FREDERICK W. McCOMBIE
BY
ATTORNEY

United States Patent Office 2,957,579
Patented Oct. 25, 1960

2,957,579
LIQUID STRAINERS

Frederick Walter McCombie, London, England, assignor to Megator Pumps & Compressors Limited, London, England Filed Sept. 30, 1957, Ser. No. 687,232

Claims priority, application Great Britain Oct. 17, 1956

5 Claims. (Cl. 210—242)

The liquid strainer forming the subject of the present invention has been designed for use on the flexible intake or suction pipe of a pump for the purpose of excluding large solids. Such a strainer is particularly suitable for association with a pump intended for extracting water from mines, quarries, excavations, and the like.

The chief object of the invention is to evolve a strainer which will float in the liquid being pumped and will effectively support the flexible pipe, the liquid being therefore drawn off from a point just below the surface where it is free from mud, silt or other suspended or floating matter.

A further object is to so construct the strainer that the intake opening to the flexible pipe will always be below the surface of the liquid, despite movement of the hose or roughness of the water.

A still further object is to evolve a strainer which, if resting on the ground in shallow water, will not be so liable to draw in mud or like material from the surface on which it is resting.

A floating strainer in accordance with the present invention is so constructed as to have a swivel connection with an associated flexible intake or suction pipe.

According to a further feature of the invention the strainer has at its upper end a buoyancy chamber or float, the swivel connection with the flexible intake or suction pipe being at the lower end of the strainer, whereby the inlet to the flexible pipe will always be situated beneath the surface of the liquid in which the strainer is freely floating.

Referring to the drawings.

Figure 1:
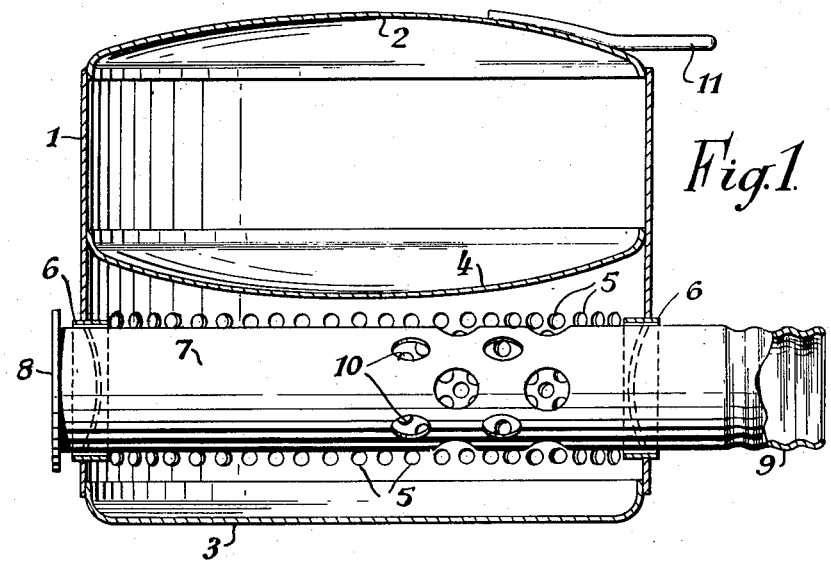
Figure 1 is a fragmentary vertical section of one form of strainer in accordance with the invention.
Figure 2:
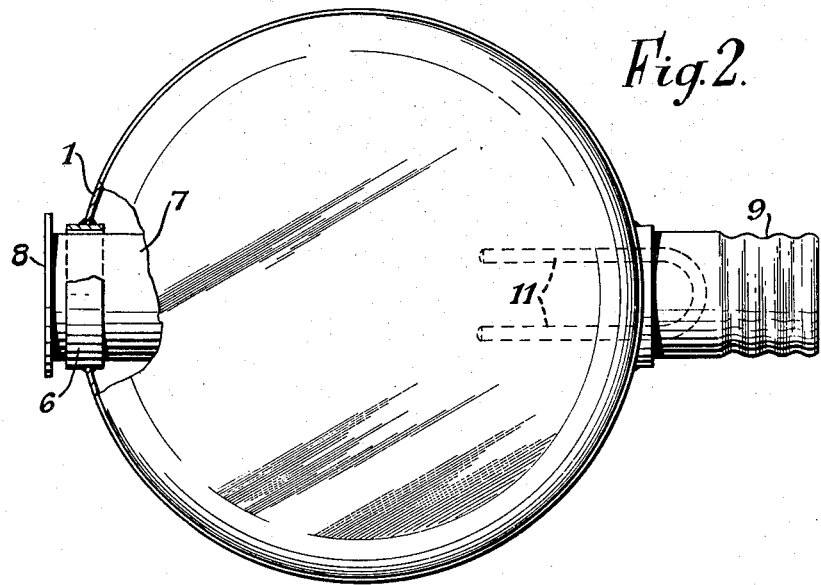
Figure 2 is an inverted plan view partially in section.
Figure 3:
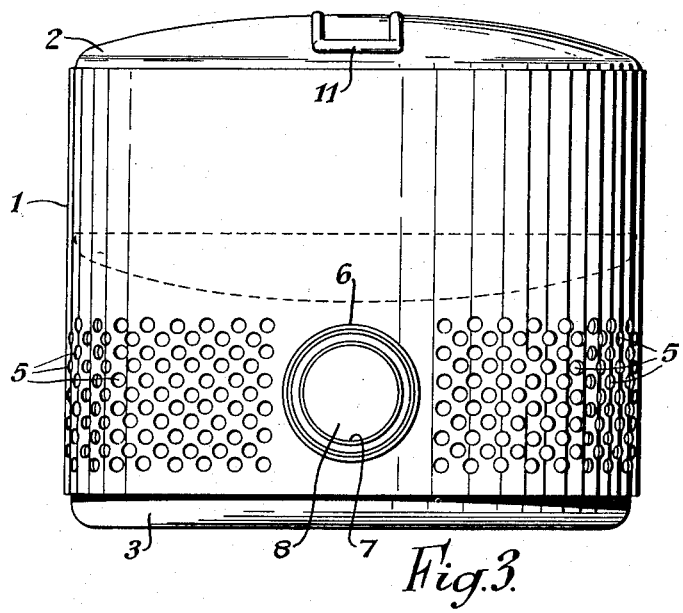
Figure 3 is an end elevation.
Figure 8:
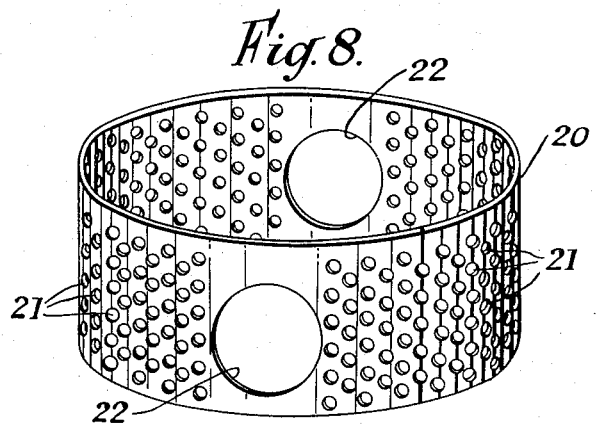
Figure 8 is a perspective view of the strainer element removed.

Referring in the first case to the construction of strainer illustrated by Figures 1 to 3, the strainer takes the form of a cylindrical body 1 having a domed upper end 2 and a substantially flat lower end 3, the body containing an inner wall of partition 4 which may also be of domed or dished construction and which, in conjunction with the domed upper end 2, provides a buoyancy chamber to cause the strainer to float in an upright position in the liquid.

The lower part of the wall of the cylindrical body is formed with a large number of perforations 5 which permit of the free flow of liquid therethrough, but exclude large solids. As will be seen clearly from Figure 3, these holes or perforations 5 are situated well below the partition 4 and, consequently, when the strainer is floating in the liquid, the perforations will lie below the level of the liquid.

Although the flexible hose may have a simple swivel connecttion with the body of the strainer, it is preferred that the body 1 shall be formed with two diametrally opposite openings, into each of which is secured a tubular bearing 6 in which bearings is freely mounted a pipe or tube 7, one end of the pipe being closed by an end plate 8 or the like, the opposite end of the pipe projecting from the opposite side of the body 1 and being corrugated or threaded as at 9 to receive a flexible intake or suction pipe having rigid or swivelling connection with the pump. Alternatively, the end of tube 7 may be formed with a number of perforations in its walls as hereinafter described in connection with the modified strainer.

The pipe 7 is provided with a number of comparatively large holes or perforations 10 in its walls and, as will be seen from Figure 1, all these holes are situated near the end of the tube 7 nearest the suction pipe.

This arrangement prevents the holes 10 from being exposed to the atmosphere and causing air to be drawn in if a sagging hose tilts the hose end of the strainer downwards, making the other end come out of the liquid.

It will be appreciated that in practice there is a tendency of the flexible hose to twist and to take up its own position, and the swivelling connection between the hose and strainer ensures that the strainer will always float upright, bearing in mind the fact that the buoyancy chamber is situated at its upper end.

A constructional feature which must not be lost sight of is the fact that if the flexible suction hose is detached from pipe 7, the latter can then be withdrawn from the body 1, leaving two fairly large holes which can be quite useful for cleaning the interior of the strainer.

The fact that the lower end of the strainer is substantially flat has the advantage of preventing an accumulation of sand inside the body which could upset the buoyancy.

The upper end of the strainer is fitted with a slinging eye 11 or the like, to which a rope can be attached for controlling the position of the strainer if it is thrown into the water on the end of the hose and for raising it if it becomes partially buried during use.

It will be appreciated that the volume of the buoyancy chamber and the weight of the strainer are so calculated that the holes 5, when the strainer is floating, will be situated just below the level of the liquid, and consequently they will not be likely to become clogged with floating matter.

In the construction shown in Figures 1 to 3, the strainer is fabricated from metal, the metal components being brazed, welded or otherwise secured together in a manner which will resist hard usage to which the strainer is likely to be subjected in use.

The buoyancy chamber may be filled with a suitable lightweight buoyancy material such as, for example, an expanded plastic material, whereby the buoyancy of the strainer will be maintained if the walls of the buoyancy chamber should be perforated.

Referring now to the alternative construction illustrated in Figures 4 to 8, it is proposed in this case to mould the parts with the exception of the strainer proper and tube 7 from a suitable thermo-plastic synthetic resin composition, or alternatively from natural or synthetic rubber.

The strainer comprises a body 1, a comparatively deep and domed cap 2 and a separately formed partition or wall 4 which in conjunction with the cap 2 forms a buoyancy chamber containing a lightweight buoyancy material indicated by reference numeral 12. The partition 4 is preferably downwardly dished as shown, and it is preferred to construct the buoyancy member 12 as a separate moulding from a suitable expanded plastic material The buoyancy member 12 is formed with a peripheral flange 13 which enters an annular recess 14 in the cap 2 and is held therein by the adjacent partition 4, the latter having a peripheral flange 15 which is sandwiched between annular flanges 16 and 17 on the cap and body respectively, all three components being secured together by a series of bolts 18.

The partition 4 is formed with a depending annular rim 19 which is spaced from the inner surface of the body to form an annular recess for the entry of the upper edge of a circular metal strainer element 20. The strainer element 20 is formed from a strip of metal bent into the form of a closed loop, the ends being butt welded together, the walls of the strainer element being perforated as at 21 and formed with two large diametrically positioned holes 22 for the passage of the tube 7.

The base of the body 1 is formed with an internal annular recess 23 in which the lower edge of the metal strainer element is located.

The base of the body 1 is flat internally and on its underside has a number of stiffening ribs 24.

Figure 4:
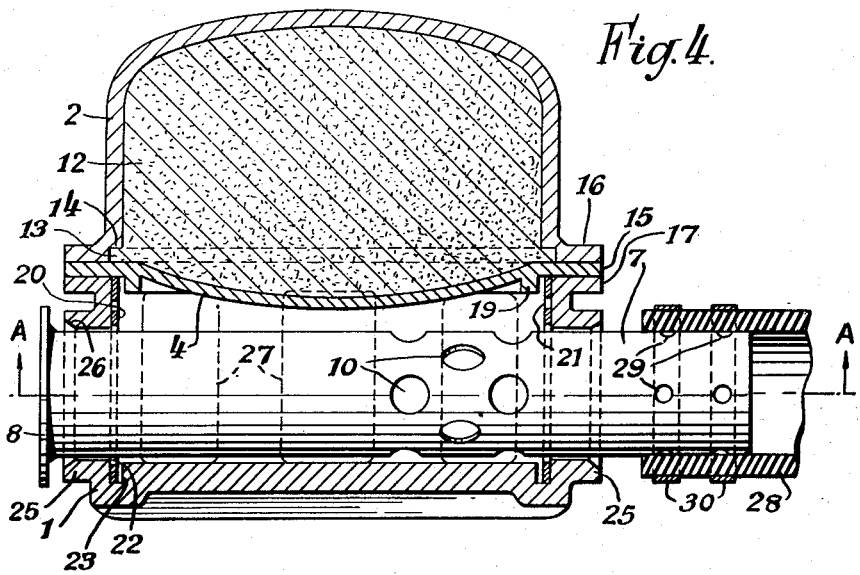
Figure 4 is a vertical longitudinal section illustrating a modified construction.

The body is formed with two large diametrally positioned holes having surrounding outwardly directed flanges 25 forming bearings for the tube 7, the flanges being internally radiused or countersunk at 26 to permit the end plate 8 on the tube 7 to be externally welded as shown in Figure 4, the object of countersinking both flanges being to enable the tube to be inserted from either side of the body.

Figure 5:
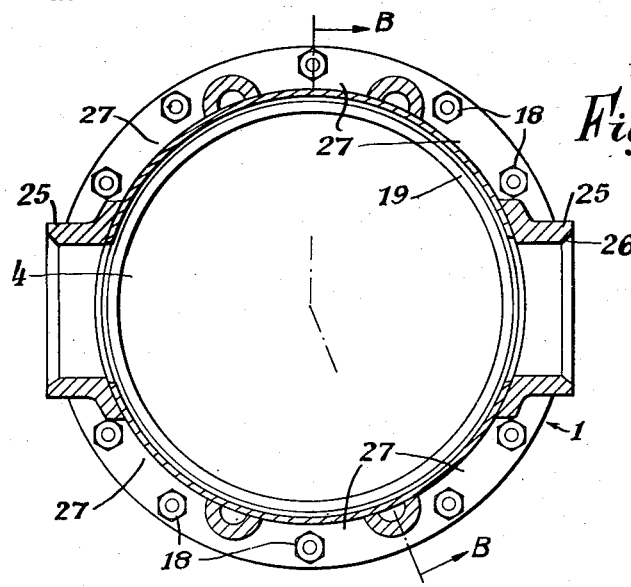
Figure 5 is a section on the line A—A in Figure 4.
Figure 6:
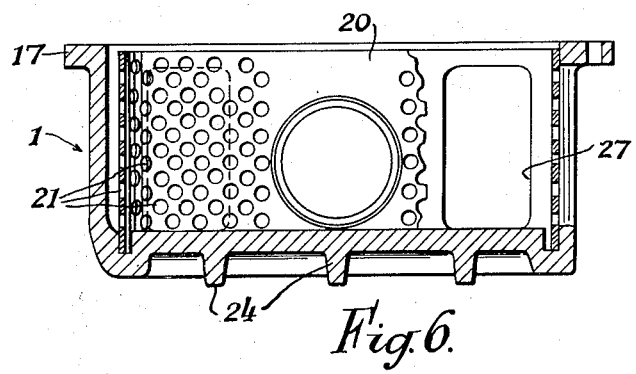
Figure 6 is a section on the line B—B in Figure 4 of the lower part of the strainer.
Figure 7:
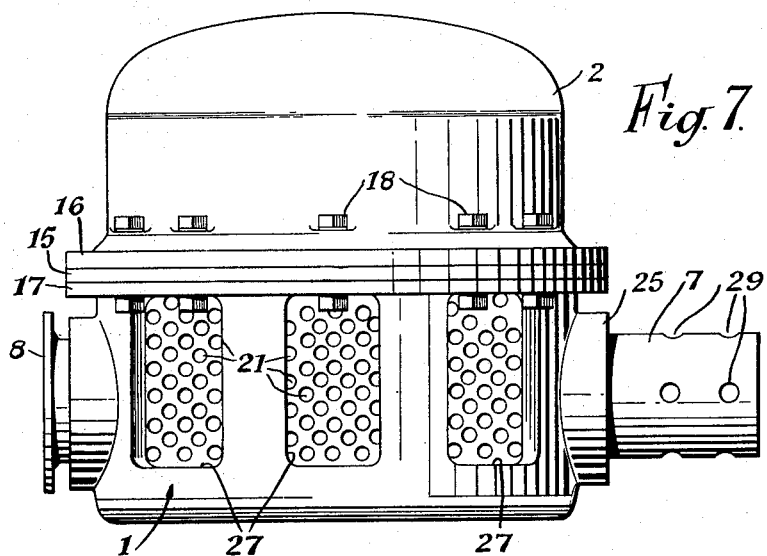
Figure 7 is a side elevation.

As will be seen clearly in Figures 5 and 7, the body is formed with three large openings 27 on opposite sides through which the liquid can pass freely, the walls of the body intermediate the openings being of the section shown in Figure 5 to give that part of the body greater strength.

As will be seen clearly in Figure 4, the holes 10 in the tube 7 are well to the hose side of the centre of the body for the purpose hereinbefore referred to.

Figure 4 illustrates an alternative method of connecting the flexible hose 28 to the tube 7 which has been found very effective in use. The tube 7 is formed in its walls near its outer end with a number of holes 29, the hose 28 being held in position by means of one or more Jubilee type clips 30, each clip lying directly over the holes so that the radial pressure exerted on the hose by the clip will cause the rubber or other comparatively soft material comprising the hose to be forced slightly into the holes to provide an effective frictional grip between the hose and tube.

One advantage of the construction shown in Figures 4 to 8 is that the strainer can be easily made up with a strainer element having any particular size of perforations to suit any particular operating conditions.

In both constructions, the perforations in the strainer for the entry of liquid are all situated near the lower end of the body but not in the undersurface, so that if the strainer is lying on the ground in shallow water, it will not tend to draw in mud, whilst the holes being covered by the water will not be liable to draw in air.

Furthermore, the general shape of the strainer with its domed upper end is strong and resistant to external pressure and internal vacuum such as might prevail if the inlet holes should become clogged. The shape also facilitates the strainer being moved about and in particular reduces it liability to get stuck or damaged if dragged along over rough ground by means of the hose.

I claim:

1. A floating strainer unit for connection with a flexible hose, comprising a body having an upper buoyancy portion and a lower strainer portion with said buoyancy portion located at a level substantially entirely above said strainer portion, the side walls of said strainer portion having holes therein for the entry of liquid, spaced bearings in and axially aligned transversely of said strainer portion, and a tube freely journaled in said bearings and having an axially disposed nipple extending beyond the side wall of said strainer portion for connection with a flexible hose, whereby said tube when journaled in said bearings is disposed directly beneath said buoyancy portion, that portion of said tube within said strainer portion having at least one hole therein for the entry of liquid from said strainer portion, and the axis of said bearings being positioned in a plane common to the center of gravity and the center of buoyancy of the strainer unit, whereby when immersed in liquid the strainer unit will automatically seek a stable upright position uniformly relative to the vertical plane of the axis of said tube regardless of the weight or position of a hose to which said tube nipple may be connected or the turbulence of the liquid in which the unit is immersed.

2. A floating strainer unit for connection with a flexible hose, comprising a body having an upper buoyancy portion and a lower strainer portion with said buoyancy portion located at a level substantially entirely above said strainer portion, the side walls of said strainer portion having holes therein for the entry of liquid, spaced bearings in and axially aligned transversely of said strainer portion, and a tube freely journaled in said bearings and having an axially disposed nipple extending beyond the side wall of said strainer portion for connection with a flexible hose, whereby said tube when journaled in said bearings is disposed directly beneath said buoyancy portion, that portion of said tube within said strainer portion having at least one hole therein for the entry of liquid from said strainer portion, the body side walls defining said strainer portion being of skeletal form defining free and open areas, said body having a removable portion which when removed provides an opening giving access to said strainer portion, and a strainer removably mounted in said strainer portion through said access opening and overlying said free and open areas and protectively enclosing said entry hole in the tube, and the axis of said bearings being positioned in a plane common to the center of gravity and the center of buoyancy of the strainer unit, whereby when immersed in liquid the strainer unit will automatically seek a stable upright position uniformly relative to the vertical plane of the axis of said tube regardless of the weight or position of a hose to which said tube nipple may be connected or the turbulence of the liquid in which the unit is immersed.

3. A floating strainer unit for connection with a flexible hose, comprising a cylindrical body having a partition transverse to the axis thereof and dividing said body into an upper buoyancy portion and a lower strainer portion, the lower end wall of said body being substantially flat and forming the bottom of said strainer portion, the cylindrical side walls only of said strainer portion having holes therein for the entry of liquid, spaced axially aligned journal bearings diametrically disposed in the cylindrical side walls of said strainer portion, and a tube freely journaled in said bearings, said tube having a closure at one end and an axially disposed nipple at the other end and extending beyond the side wall of said strainer portion for connection with a flexible hose, that portion of said tube within said strainer portion having holes therein and adjacent the nipple end thereof for the entry of liquid from said strainer portion, and the axis of said bearings being positioned in a plane common to the center of gravity and the center of buoyancy of the strainer unit, whereby when immersed in liquid the strainer will automatically seek a stable upright position uniformly relative to the vertical plane of the axis of said tube regardless of the weight or position of a hose to which said tube nipple may be connected or the turbulence of the liquid in which the unit is immersed.

4. A floating strainer unit for connection with a flexible hose, comprising a body forming an upper buoyancy portion; a lower strainer portion removably attached beneath said body and including a cup-shaped part having side walls of skeletal form defining free and open areas, a liquid admitting strainer removably mounted in said cup-shaped part and overlying said free and open areas, and means removably attaching the rim of said cup-shaped part to said body; spaced bearings in and axially aligned transversely of said strainer portion; a tube freely journaled in said bearings and having an axially disposed nipple extending beyond the side wall of said strainer portion for connection with a flexible hose; that portion of said tube within said strainer portion having at least one hole therein for the entry of liquid from said strainer portion; said strainer protectively enclosing said tube entry hole; and the axis of said bearings being positioned in a plane common to the center of gravity and the center of buoyancy of the strainer unit, whereby when immersed in liquid the strainer unit will automatically seek a stable upright position uniformly relative to the vertical plane of the axis of said tube regardless of the weight or position of a hose to which said tube nipple may be connected or the turbulence of the liquid in which the unit is immersed.

5. A floating strainer unit for connection with a flexible hose, comprising a body having a transverse partition dividing said body into an upper buoyancy portion and a lower strainer portion; said body including an imperforate upper inverted cup-shaped part, a platelike part, a second cup-shaped part having a substantially flat imperforate bottom wall with side walls of skeletal form defining free and open areas, an annular strainer removably mounted in said second cup-shaped part and overlying said free and open areas for the entry of liquid, and means releasably securing the rim portions of said cup-shaped parts together with said platelike part sandwiched therebetween and forming said transverse partition, said platelike part having an annular wall on its underside and said second cup-shaped part having a corresponding annular wall on the upper or inner surface of its bottom wall, the edge portions of said annular strainer surrounding and being braced by said annular walls; spaced axially aligned journal bearings diametrically disposed in the side walls of said second cup-shaped part, said strainer having diametrically disposed holes corresponding to said journal bearings, and a tube freely journaled in said bearings, said tube having a closure at one end and an axially disposed nipple at the other end and extending beyond the side wall of said strainer portion for connection with a flexible hose, that portion of said tube within said strainer portion having holes therein and adjacent the nipple end thereof for the entry of liquid from said strainer portion, and the axis of said bearings being positioned in a plane common to the center of gravity and the center of buoyancy of the strainer unit, whereby when immersed in liquid the strainer unit will automatically seek a stable upright position uniformly relative to the axis of said tube regardless of the weight or position of a hose to which said tube nipple may be connected or the turbulence of the liquid in which the unit is immersed.

References Cited in the file of this patent

UNITED STATES PATENTS

| | | |
|---|---|---|
| 717,932 | Scudder | Jan. 6, 1903 |
| 1,579,917 | Deming | Apr. 6, 1926 |
| 1,591,923 | Lebherz | July 6, 1926 |
| 1,955,308 | Naftel et al. | Apr. 17, 1934 |
| 2,192,438 | Gulick | Mar. 5, 1940 |
| 2,335,096 | Zech | Nov. 23, 1943 |